Patented July 22, 1924.

1,502,129

UNITED STATES PATENT OFFICE.

GEORGE H. STARMANN AND HENRY LINDENBERGER, OF CHICAGO, ILLINOIS, ASSIGNORS TO U. S. REDUCTION CO., A CORPORATION OF ILLINOIS.

PROCESS OF MELTING SCRAP METAL AND RECOVERING BY-PRODUCTS THEREFROM.

No Drawing.   Application filed December 18, 1919.   Serial No. 345,780.

*To all whom it may concern:*

Be it known that we, GEORGE H. STARMANN and HENRY LINDENBERGER, citizens of the United States, and residents of the city of Chicago, in the county of Cook and State of Illinois, have invented certain new and useful Improvements in a Process of Melting Scrap Metal and Recovering By-Products Therefrom; and we do hereby declare that the following is a full, clear, and exact description of the same.

This invention relates to a method or process of melting scrap metal and obtaining by-products therefrom.

Hitherto in melting scrap metal such as turnings, borings, chips, filings, skimmings, drosses or the like there has been very considerable loss due to oxidation, especially in view of the large exposed surface of such small particles of metal.

Further in melting scrap aluminum very appreciable amounts of aluminum nitride are formed in addition to oxide, the finer the particles of aluminum the greater the quantity of nitride.

One of the principal objects of this invention is to prevent such oxidation as far as possible.

Another object of the invention is to collect any aluminum nitride which may be formed in melting scrap aluminum and subsequently obtaining ammonia or ammonium compounds therefrom.

According to this invention, therefore, the bath of molten metal is kept covered by a layer of fused material through which additional scrap metal may be passed periodically as the molten metal is withdrawn from beneath. In this layer of fusible material collects a variety of substances such as small globules of metal, metallic oxides, nitride in the case of aluminum scrap, and carbonized organic matter and the like so that it must be renewed from time to time.

A layer of fused silicates such as compose ordinary blast furnace slag forms on cooling a hard vitreous mass from which entrained metallic particles, nitrides, etc., cannot readily be extracted, since fine crushing is necessary to enable the slag to be separated from the metal and to expose the nitride so that it may be acted on by water.

Further, particularly in the case of aluminum, any metallic "shot" in the slag tends to jamb the crusher and frequently cause it to break.

A much more satisfactory material, therefore, is a metallic salt which is readily soluble in water and which has a melting point not greatly in excess of the melting point of the metal to be fused.

Further, it is desirable that the salt should be readily crystallizable and also substantially non-deliquescent.

The most convenient salt for this purpose appears to be sodium chloride, as it combines all of these properties since it is readily soluble, melts at 805° C., is easily crystallizable and is also substantially non-deliquescent. Calcium chloride may be employed, but, while melting at a somewhat lower temperature than sodium chloride, it is not readily crystallized and is very deliquescent so that it is ordinarily not as suited for the purpose as sodium chloride.

It is also important that the salt when inserted in the furnace be anhydrous to avoid explosions or violent sputtering, and in this respect sodium chloride is particularly suitable as it crystallizes without any water of crystallization, and may be readily preliminarily heated to drive off any contained water, whereas calcium chloride separates out from solution with six molecules of water of crystallization and does not lose this water until it has been heated to a temperature in excess of 200° C.

When the layer of salt has become laden with other materials it is drawn off, allowed to cool and then treated with sufficient water to dissolve the salt present. This treatment is preferably carried out in a closed vessel to prevent the escape of any ammonia which may be formed and not retained in solution in the water. The liquor is then filtered to remove aluminum oxide, sand, carbonaceous material, some aluminum hydroxide and other material. The filtrate is then passed into an evaporator where the ammonia in solution is driven off and may be converted into ammonium sulphate by absorption in sulphuric acid. Evaporation is continued until the salt is precipitated when it is removed, dried and reinserted into the furnace for further use.

In actual practice with scrap aluminum we have found that good results may be obtained with an oil-fired furnace of the reverbatory type and a temperature of 800° to 900° C. This is not high enough to reduce alumina, but is high enough to form aluminum nitride and also to fuse the sodium chloride used to prevent oxidation. The layer of fused salt may conveniently range from 2 to 7 inches according to the amount of impurity in the scrap. A small amount of cryolite or other salt adapted to increase the fluidity of the fused salt may be employed to advantage.

The salt is ordinarily retained in the furnace until it carries about 3 to 5 per cent of aluminum nitride, (the time of retention in the furnace being determined by the viscosity of the layer of salt due to the accumulation of impurities therein), when it is withdrawn and treated with water to recover the salt and form ammonia.

Where the aluminum scrap is very fine and heavily contaminated with impurities, the salt diffuses throughout the mass, becomes thoroughly mixed therewith, and is used to convert the scrap not into a large mass of molten metal but into separate particles or shot distributed through the salt layer or bath. This shot is recovered by leaching and then introduced into a second furnace or in a further charge in the same furnace with coarser cleaner scrap to obtain a bath of molten metal. Where the production of shot is the desideratum a high viscosity in the salt layer or bath is not deleterious or harmful. Whether the scrap is fine or coarse some aluminum "shot" will be formed in the salt layer which may be returned to the furnace with a further charge of aluminum scrap.

It is obvious that details of the process may be changed or varied, and we do not purpose limiting the patent otherwise than as necessitated by the prior art.

We claim as our invention:

1. A method of obtaining ammonia from scrap aluminum including melting the scrap aluminum beneath a fused layer of a soluble salt, the subsequent leaching of the salt with water to dissolve the salt and simultaneously convert the aluminum nitride collected by the salt during the melting operation into aluminum hydroxide and ammonia and separating the ammonia so formed from the other materials.

2. A method of melting scrap metal including the use of a bath of molten aluminum covered by a fused layer of sodium chloride to prevent oxidation of the aluminum while allowing scrap metal to pass through said layer for incorporation with the molten aluminum beneath.

3. A method of melting scrap aluminum and obtaining ammonia as a by-product including melting the scrap aluminum beneath a fused layer of soluble salt, drawing off the molten metal, the subsequent leaching of the salt with water to dissolve the salt and simultaneously convert the aluminum nitride collected by the salt during the melting operation into aluminum hydroxide and ammonia filtering off the aluminum hydroxide and finally evaporating the liquor to recover the salt in solid form and simultaneously drive the ammonia out of solution.

4. A method of melting scrap metal including forming metallic shot by introducing metallic scraps into a fused mass of salt, leaching out the salt, separating the shot from other insoluble non-metallic residues and subsequently melting the shot to form a single mass of molten metal.

5. A method of melting scrap metal including the formation of a bath of molten aluminum, covered with a layer of fused sodium chloride, introducing impure aluminum scrap through said layer of fused salt into said bath, whereby globules of aluminum will be formed in said layer of fused salt, removing said layer, permitting it to cool, leaching out the salt, separating the shot from the other insoluble non-metallic residues, and introducing said shot into a bath of molten aluminum covered with a layer of fused sodium chloride.

In testimony whereof, we have hereunto subscribed our names in the presence of two subscribing witnesses.

GEORGE H. STARMANN.
HENRY LINDENBERGER.

Witnesses:
RIDSDALE ELLIS,
EARL M. HARDINE.